United States Patent [19]

Harrison

[11] 4,328,116
[45] May 4, 1982

[54] LIQUID CRYSTAL COMPOSITIONS FOR MULTIPLEXED DISPLAYS

[75] Inventor: Kenneth J. Harrison, Malvern Link, England

[73] Assignee: Minnesota Mining and Manufacturing Company, Saint Paul, Minn.

[21] Appl. No.: 191,774

[22] Filed: Sep. 29, 1980

Related U.S. Application Data

[63] Continuation-in-part of Ser. No. 90,423, Nov. 1, 1979, abandoned.

[51] Int. Cl.³ .............................. C09K 3/34; G02F 1/13
[52] U.S. Cl. .......................... 252/299.63; 252/299.64; 252/299.66; 350/350 R
[58] Field of Search ..................... 252/299.63, 299.64, 252/299.66; 350/350 R

[56] References Cited

U.S. PATENT DOCUMENTS

| | | | |
|---|---|---|---|
| 3,947,375 | 3/1976 | Gray et al. | 252/299.66 |
| 3,974,087 | 8/1976 | Gray et al. | 252/299.66 |
| 4,002,670 | 1/1977 | Steinstrasser | 252/299.64 |
| 4,011,173 | 3/1977 | Steinstrasser | 252/299.5 |
| 4,083,797 | 4/1978 | Oh | 252/299.66 |
| 4,113,647 | 9/1978 | Coates et al. | 252/299.63 |
| 4,137,192 | 1/1979 | Matsufuki | 252/299.66 |
| 4,147,651 | 4/1979 | Oh | 252/299.66 |
| 4,154,697 | 5/1979 | Eidenschink et al. | 252/299.63 |
| 4,293,434 | 10/1981 | Deutscher et al. | 252/299.63 |

FOREIGN PATENT DOCUMENTS

| | | | |
|---|---|---|---|
| 2752975 | 8/1978 | Fed. Rep. of Germany | 252/299.63 |
| 2854310 | 6/1979 | Fed. Rep. of Germany | 252/299.63 |
| 2934918 | 3/1980 | Fed. Rep. of Germany | 252/299.63 |
| 105701 | 5/1979 | German Democratic Rep. | 252/299.63 |
| 54-6884 | 1/1979 | Japan | 252/299.63 |
| 54-101784 | 8/1979 | Japan | 252/299.63 |
| 54-118389 | 9/1979 | Japan | 252/299.63 |
| 54-148184 | 11/1979 | Japan | 252/299.63 |
| 54-152684 | 12/1979 | Japan | 252/299.63 |
| 56-2375 | 1/1981 | Japan | 252/299.61 |
| 56-2382 | 1/1981 | Japan | 252/299.61 |
| 2017742 | 10/1979 | United Kingdom | 252/299.63 |
| 2028363 | 3/1980 | United Kingdom | 252/299.63 |

Primary Examiner—Teddy S. Gron
Attorney, Agent, or Firm—Cruzan Alexander; Donald M. Sell; William B. Barte

[57] ABSTRACT

In accordance with the invention, a liquid crystal composition for multiplexed twisted nematic displays which exists in a nematic mesophase from at least about $-20°$ C. to $50°$ C., comprises:
(a) From two to four cyanobiphenyl compounds represented by the formula:

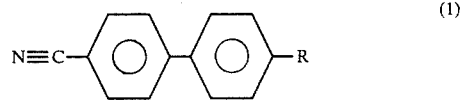

(1)

wherein R is selected from the group consisting of straight chain alkyl groups having two to ten carbon atoms and the propoxy radical and wherein compounds with alkyl groups of 2 to 4 carbons range from approximately 5 to 10% by weight of the total composition and the propoxy compound ranges from approximately 5 to 15% by weight of the total composition, at least one of said compounds having an alkyl group having two to seven carbon atoms and at least one of said compounds having an alkyl group with seven to ten carbon atoms and constituting not less than approximately 25% by weight of the total composition,
(b) at least one cyclohexane carboxylate ester compound represented by the formula:

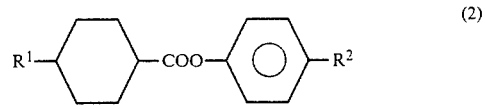

(2)

wherein $R^1$ is selected from the group consisting of straight chain alkyl groups having two to three carbon atoms, and $R^2$ is selected from the group consisting of straight chain alkoxy groups having three to six carbon atoms, and wherein the saturated ring has a trans conformation; and (c) at least one diester compound represented by the formula:

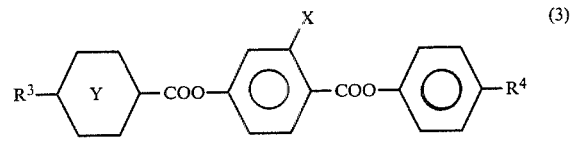

wherein $R^3$ is selected from the group consisting of straight chain alkyl groups having one to five carbon atoms, $R^4$ is selected from the group consisting of straight chain alkyl groups having four or five carbon atoms, X is H or Cl and wherein

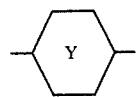

is either aromatic or saturated with a trans conformation.

9 Claims, 1 Drawing Figure

EXAMPLE 11
CONDITIONS - 1 IN 10 DUTY CYCLE
7μ CELL - LOW TILT ALIGNMENT (SiO)
25°C
NO CROSSTALK ABOVE 45° OFF AXIS

LIQUID CRYSTAL COMPOSITIONS FOR MULTIPLEXED DISPLAYS

CROSS-REFERENCE TO RELATED APPLICATIONS

This application is a continuation-in-part of previously filed, copending U.S. application Ser. No. 90,423, filed: Nov. 1, 1979, now abandoned.

BACKGROUND OF THE INVENTION

1. Field of the Invention

The invention is directed to liquid crystal compositions and, in particular, to liquid crystal compositions which are useful in multiplexed twisted nematic display devices, with the nematic phase existing from at least about $-20°$ C. to at least about $50°$ C.

2. Description of the Prior Art

Liquid crystal displays are now being employed in numerous commercial applications as electro-optical indicator systems and many types of these systems have now been developed, including those utilizing the twisted nematic field effect. For display devices based on the twisted nematic field effect, it is now recognized that the liquid crystal composition should exhibit positive dielectric anisotropy, a mesomorphic temperature range, including room temperature, of at least $\leq 0°$ C. to $\geq 40°$ C., a birefringence of about 0.13 or greater, a low viscosity for good response times, and be preferentially aligned on supporting substrates to constitute an initially twisted structure. A number of methods are known in the prior art to produce suitable alignment of liquid crystal materials, as is apparent to the artisan.

In addition to the above-mentioned desirable characteristics, the liquid crystal material should, for long term device reliability, be an eutectic composition, have high purity, and exhibit good chemical, photochemical and electrochemical stability.

Where the number of addressed elements in a liquid crystal display is small, separate connections are made to each element, i.e., one driver per element. In this "static drive" mode, zero voltage is applied to an unselected (OFF) element, and a finite voltage greater than the threshold ($V_{Thr}$), to selected (ON) elements. Such addressing may be used in simple wristwatch displays (4 to 6 digits, 7 segments per digit) where the threshold voltage is typically $<1.5$ V and the operating voltage is 3 V.

Many liquid crystal compositions are known that meet the majority of the above requirements and may be obtained commercially, e.g., cyanobiphenyl compounds may be obtained from B.D.H. Chemicals Ltd., Poole, Dorset BH12 4NN, England.

For complex, multi-element displays, e.g., calculator, alpha-numeric, dot matrix displays, it may not be possible to make separate connections to each element and some form of multiplexing or matrix addressing (time sharing) is required. Liquid crystal displays in general, and twisted nematic displays in particular, change their optical properties in response to the RMS (root mean square) value of the alternating voltage. In this "dynamic drive" mode, a finite voltage ($V_{off}$) is applied to unselected (OFF) elements and a higher voltage to the selected (ON) elements. To avoid "crosstalk", where an unselected (OFF) element appears visible, $V_{off}$ is set below the threshold voltage ($V_{Thr}$). For conventional multiplexing, there is a maximum value of the ratio $V_{on}:V_{off}$ dependent upon the number of scanned rows (n), $$\frac{V_{on}}{V_{off}} = \sqrt{\frac{\sqrt{n} + 1}{\sqrt{n} - 1}}$$

The relationship between $V_{on}:V_{off}$ and number of scanned rows (n) may be seen as follows:

| n | $R = \dfrac{(V_{on}) \text{ rms}}{(V_{off}) \text{ rms}}$ |
|---|---|
| 2 | 2.414 |
| 3 | 1.932 |
| 4 | 1.732 |
| 5 | 1.618 |
| 6 | 1.543 |
| 7 | 1.488 |
| 8 | 1.447 |
| 9 | 1.414 |
| 10 | 1.387 |

To achieve a decreased duty cycle (i.e., greater number of scanned rows), the liquid crystal composition and display construction must be chosen to reduce the $V_{on}:V_{off}$ ratio, since "crosstalk" does not allow the $V_{off}$ voltage to be scaled to increase the $V_{on}$ voltage and give equivalent contrast at a lower duty cycle.

The threshold voltage ($V_{Thr}$), which determines the $V_{off}$ voltage is not a single value for a given liquid crystal composition and display construction, but varies as a function of the angle of viewing and temperature. Furthermore, the twisted nematic display is characterized by a shallow electrooptic transmission curve.

The effects of liquid crystal material birefringence ($\Delta n$), cell spacing, and surface alignment on the electrooptic characteristics of a twisted nematic display indicate that the $V_{on}:V_{off}$ ratio is minimized by using a low birefringent material, a thin cell spacing, and a near zero tilt surface alignment. Furthermore, the threshold voltage ($V_{Thr}$) and the sharpness of the contrast curve is determined by the dielectric anisotropy and the ratios of the three elastic constants (splay $k_{11}$, twist $k_{22}$, bend $k_{33}$). A favorable combination of these parameters leads to a sharp "knee" in the electro-optic transmission curve and thus a lower $V_{on}:V_{off}$ ratio.

The temperature dependence of the threshold, an intrinsic property of the liquid crystal composition, varies from class to class of materials. Where temperature compensation of the addressing voltages is not done, the $V_{off}$ voltage is set at the highest operating temperature to avoid crosstalk at lower temperatures and is the most significant parameter in producing low duty cycle, multi-element displays.

Liquid crystal compositions to effect a reduction in the ratio $V_{on}:V_{off}$ have recently been formulated from mixtures of positive (Np) and negative (Nn) dielectric anisotropy components, rather than purely positive materials. A few of the latter type of compositions exhibit satisfactory multiplexing characteristics, e.g., pure cyanobiphenyls/terphenyl mixtures, known as "E26M" and "E25M" which are available from B.D.H. Chemicals Ltd., Poole, Dorset BH12 4NN, England. However, such compositions, whilst having quite sharp threshold characteristics, do exhibit a large temperature-threshold variation. Liquid crystal compositions of cyanophenylcyclohexanes (Np) and esters (Nn) exhibit low temperature-threshold dependence, but do not have sharp electro-optic transmission curves, e.g., compositions known as "ZL1 1216" and "ZL1 1253" which are available from E.M. Laboratories, 500 Executive Boulevard, Elmsford, New York 10523. Liquid crystal compositions of cyanobiphenyls (Np) and benzoate esters (Nn) have been used in low duty cycle (1 in 7) multiplexed displays particularly for displays where temperature compensation of the addressing voltages is done (see, for example K. Odawaru et al, "*An 80-Character Alphanumeric Liquid Crystal Display System for Computer Terminals*", S.I.D. Digest, paper number 13.6, 1979).

To compare the "degree of multiplexing" of the different types of liquid crystal compositions, a figure of merit may be defined when the compositions are examined under the same conditions of cell spacing, surface alignment, polarizer combination, addressing waveform, illumination and detection system. The merit number may be defined by the ratio of the minimum threshold voltage to the voltage for a given transmission (contrast or contrast ratio) at a particular position of viewing of the display. This has been done for a number of presently available "multiplexing mixtures". (See E. P. Raynes, "*Recent Advances in Liquid Crystal Materials and Display Devices*", IEEE/SID Biennial Display Research Conference pp. 8–11, 1979.) Mixtures of different classes of liquid crystal materials, particularly those of positive and negative dielectric anisotropy, produced compositions with enhanced multiplexing capability.

It is known that some liquid crystal compositions of purely nematic components exhibit induced smectic behavior, thus decreasing the useful operating temperature range of the composition in a twisted nematic display device. Whilst components from a single class of compounds may show this behavior, (e.g., mixtures of higher homologues of cyanobiphenyls), mixtures of different classes of compounds exhibit this behavior most readily, particularly Np and Nn materials, e.g., cyanobiphenyls and benzoate esters. Specific examples of mixtures of terminal nonpolar and polar liquid crystals are given in B. Engelen et al, *Molecular Crystals and Liquid Crystals,* Vol. 49 (letters), pp. 193–197, 1979, and Ch. S. Oh. *Molecular Crystals and Liquid Crystals,* Vol. 42, 1, 1977. Such behavior limits the choice and composition of components (see U.S. Pat. No. 4,147,651) for an adequate temperature range of operation of a twisted nematic display device.

The degree of alignment of the liquid crystal composition is extremely important to producing a twisted nematic display, both the electro-optical performance, and the longevity of the display device being critically determined by this interface. Many alignment methods are known in the prior art, both organic and inorganic layers, and different classes of liquid crystal materials are oriented to greater or lesser degrees by these surfaces. Of particular interest are alignment surfaces that will withstand high temperatures as seen in sealing display cells with glass frit to enable fabrication of hermetic packages. As is now well-known, silicon monoxide may be deposited to give a suitable alignment surface for multiplexed displays.

It is the inventor's experience that such surfaces do not align, over broad temperatures, many liquid crystal compositions incorporating prior art mixtures of cyanobiphenyls and benzoate esters, particularly those that give good multiplexing behavior on other surfaces, e.g., polyvinyl alcohol rubbed surfaces. This is seen as a major drawback to the use of such compositions in long life glass frit sealed displays.

To the nematic phase of liquid crystal compositions used in the twisted nematic display, it is common to add a small percentage of an optically active component which may or may not be a cholesteric liquid crystal. The resultant long pitch cholesteric liquid crystal composition has a unique sense of twist in the display cell and eliminates the possible existence of reverse twist areas.

Nonetheless, notwithstanding the formidable selection of mixtures of active compounds described in the prior art, it is believed that the prior art teachings nowhere teach, nor do they render obvious, the particular compositions of the present invention which have advantageous liquid crystal display characteristics.

SUMMARY OF THE INVENTION

In accordance with the invention, a liquid crystal composition for multiplexed twisted nematic displays which exists in a nematic mesophase from at least about $-20°$ C. to 50° C., comprises:

(a) From two to four cyanobiphenyl compounds represented by the formula:

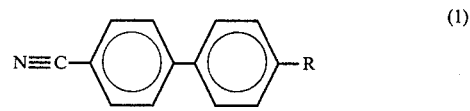

wherein R is selected from the group consisting of straight chain alkyl groups having two to ten carbon atoms and the propoxy radical and wherein compounds with alkyl groups of 2 to 4 carbons range from approximately 5 to 10% by weight of the total composition and the propoxy compound ranges from approximately 5 to 15% by weight of the total composition, at least one of said compounds having an alkyl group having two to seven carbon atoms and at least one of said compounds having an alkyl group with seven to ten carbon atoms and constituting not less than approximately 25% by weight of the total composition;

(b) at least one cyclohexane carboxylate ester compound represented by the formula:

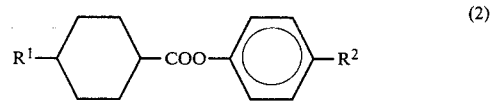

wherein $R^1$ is selected from the group consisting of straight chain alkyl groups having two to three carbon atoms, and $R^2$ is selected from the group consisting of straight chain alkoxy groups having three to six carbon atoms, and wherein the saturated ring has a trans conformation; and (c) at least one diester compound represented by the formula:

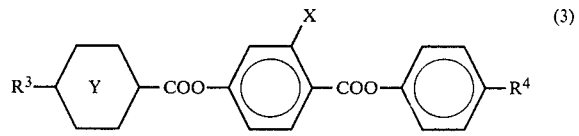

wherein $R^3$ is selected from the group consisting of straight chain alkyl groups having one to five carbon atoms, $R^4$ is selected from the group consisting of straight chain alkyl groups having four or five carbon atoms, X is H or Cl and wherein

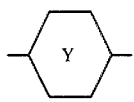

is either aromatic or saturated with a trans conformation.

In the compositions of the present invention, the cyanobiphenyls range from about 60 to about 73% by weight of the composition, the cyclohexane carboxylate esters range from about 15 to about 23% by weight of the composition and the diesters range from about 5 to about 10% by weight of the composition when X is H and from about 5 to about 16% by weight when X is Cl.

Preferred are cyanobiphenyl compounds having an alkyl group of seven carbon atoms and a combination of cyanobiphenyl compounds having alkyl groups of seven and eight carbon atoms. The mixtures of the present invention have positive dielectric anisotropy and electro-optic characteristics suitable for multiplexing at least five lines (20 duty cycle) in a twisted nematic display. The compositions of the invention have moderate viscosity and a birefringence of 0.16 to 0.19, making them usable in displays with cell spacings of approximately 7 $\mu$m. The compositions are chemically and photochemically stable.

DETAILED DESCRIPTION OF THE INVENTION

Figure 1:
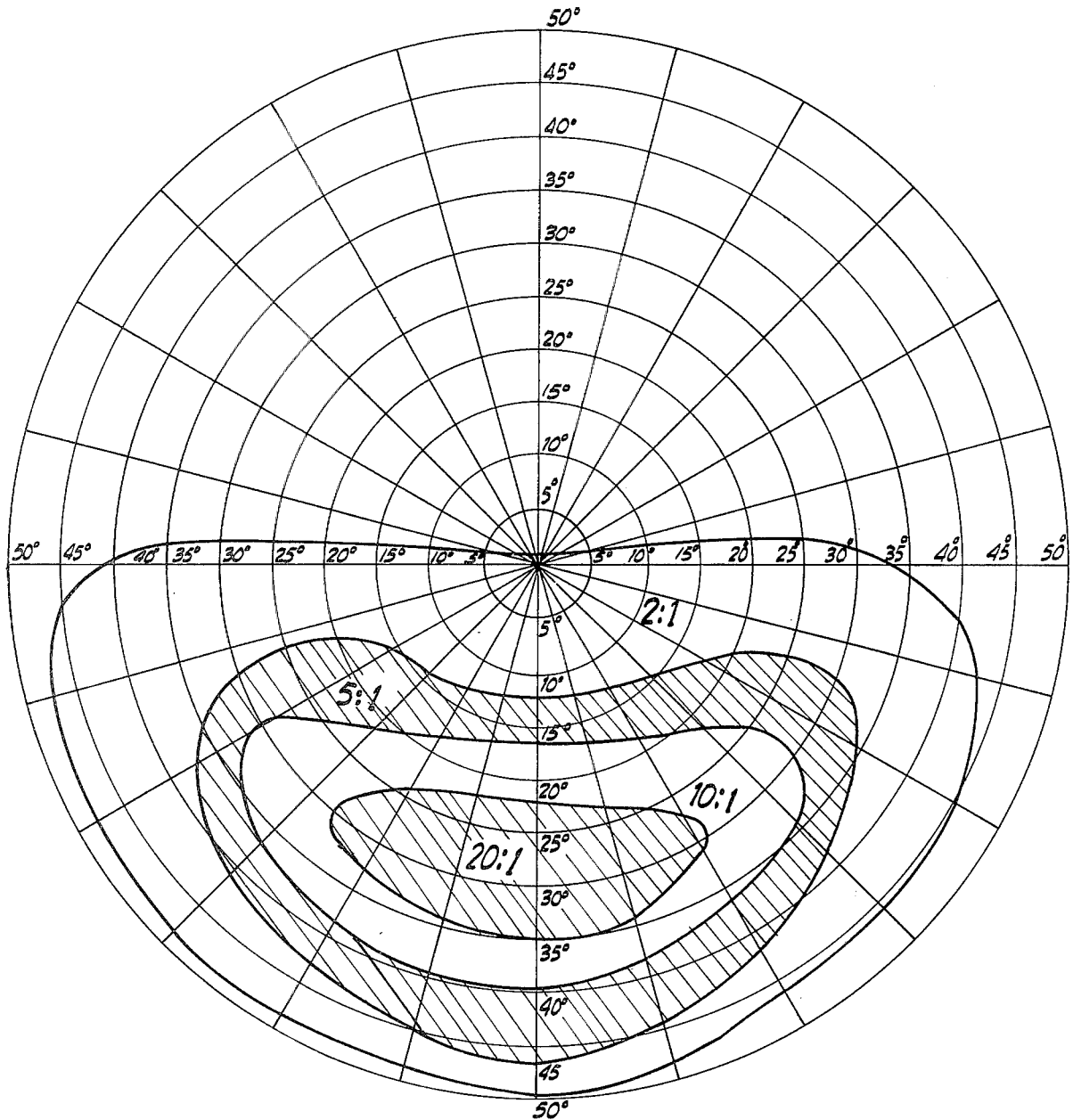
FIG. 1 illustrates a viewing cone plot of contrast ratios for a composition of the present invention at a 1 in 10 duty cycle up to 50° off axis.

Generally speaking, the cyanobiphenyls are attractive liquid crystal materials for twisted nematic display devices. Many exhibit low melting nematic phases with high positive dielectric urisotropy, low viscosity and high birefringence. The latter is very important, allowing one to add esters, which have an intrinsic low birefringence, and maintain an overall value suitable for use in a wide range of cell sparrings down to ~7 $\mu$m.

For good contrast in multiplexed displays, the most important parameter is a steep transmission vs. voltage curve and this is reflected in the merit number as described in the prior art.

It was discoverd that certain cyanobiphenyls give better electro-optical performance in twisted nematic display devices as defined by the merit number. Specifically, those compounds with long alkyl chains i.e. $C_7$–$C_{10}$ were superior to those with shorter alkyl chains. However, none of the pure cyanobiphenyls give adequate performance when multiplexed with a duty cycle of 1 in 5 to 1 in 10.

The performance of the longer chain compounds could be improved with the desired level by adding one or more cyclohexane carboxylate esters. It was observed that such mixtures were not compatible in all compositions, readily producing an induced smectic phase. The temperature range and composition range of this phase was determined by the length of the carbon chain in both the cyanobiphenyls and the esters.

For most applications the twisted nematic display device should exhibit a nematic phase to a lower temperature of −20° C. In mixtures of longer chain cyanobiphenyls and the cyclohexane carboxylate esters, this was found to be possible only in specific compositions on either side of the induced smectic phase. Furthermore, the preferred cyanobiphenyls with a $C_7$–$C_{10}$ group exhibited a very small composition range which restricted their use even further. Whilst the alkyl cyanobiphenyls do exhibit a nematic at certain compositions, the alkoxy cyanobiphenyls, with greater than three carbons in the alkyl chain, exhibit virtually no nematic compositions in the region of room temperature due to a more enhanced smectic phase and may not be used in mixtures with the esters. It was desirable to use those compositions with a high cyanobiphenyl concentration and low ester concentration rather than vice versa, because of the advantageous higher birefringence, typically >0.16 and the lower threshold, typically <1.5 volts. Within the scope of desired combination of cyanobiphenyls and esters, it was found that a minimum percentage of ester was required to produce improved electro-optical performance over the pure cyanobiphenyls. Furthermore, many of the preferred long chain alkyl cyanobiphenyls exhibit a smectic phase and by addition of a minimum percentage of ester decreased this smectic phase thermal stability to produce the desired low temperature nematic phase.

It was further discovered that the shorter chain alkyl and alkoxy cyclohexane carboxylate esters were necessary to allow adequate composition ranges with the preferred longer chain cyanobiphenyls. In addition, the alkyl chain on the cyclohexyl ring had a greater influence on induced smectic behavior over the alkoxy group on the phenyl ring and, consequently, the choice of esters is limited. However, it is more beneficial to use the longer chain alkyl cyanobiphenyls and shorter chain esters rather than vice versa for good electro-optical performance.

For practical twisted nematic display devices, the nematic phase should exist from −20° C. to greater than 50° C. and preferably to greater than 55° C. In order to extend the nematic range of cyanobiphenyls and esters it is found necessary to add a higher clearing point component. It was desirable to add a diester up to a given weight percent of the mixture. Above this, the diester was detrimental to the electro-optical performance of the mixture and induced the undesirable smectic phase, particularly when not a lateral chloro compound. The addition of diester had the further effect of increasing viscosity and was kept to a minimum weight percentage of the composition.

It was found that only by using certain compositions of cyanobiphenyls, esters, and diesters and, furthermore, specific compounds of these classes could a nematic phase of wide temperature range in a material with good multiplexing performance be obtained. These novel mixtures have the added advantage of medium viscosity, low threshold, and high birefringence.

These compositions were found to align well on all the surfaces commonly used for alignment layers in twisted nematic display devices. Examples of such surface coatings are silicon monoxide, organosilanes and polyimide. This behavior is advantageous over prior art mixtures which have been found to be aligned only on specific surfaces e.g. organo silane and not silicon monoxide.

The compositions of the invention contain three essential classes of compounds in specified amounts: cyanobiphenyls, cyclohexane carboxylate esters and diesters.

From the cyanobiphenyl class, from two to four cyanobiphenyl compounds are essential to the composition of the present invention. These cyanobiphenyls are represented by the formula:

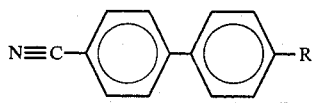
(1)

wherein R is selected from the group consisting of straight chain alkyl groups having two to ten carbon atoms and the propoxy radical. It is required that at least one of these compounds has an alkyl group having two to seven carbon atoms. It has been discovered that, if only one cyanobiphenyl compound is employed in the composition of the present invention, adequate melting point temperature depression will not be achieved and nematic range may be inferior. Thus, the present invention requires two to four cyanobiphenyl compounds in the composition. Desirably, at least three cyanobiphenyls are present in the composition of the present invention and, preferably, one contains a propoxy group. These desired and preferred embodiments appear to result in wider temperature ranges. Examples of suitable cyanobiphenyls useful in the practice of the present invention include compounds in which R is $-C_2H_5$, $-C_5H_{11}$, $-C_7H_{15}$, $-C_8H_{17}$, $-C_{10}H_{21}$ and $-OC_3H_7$.

At least one cyclohexane carboxylate ester is also present in the compositions of the present invention. The cyclohexane carboxylate esters are represented by the formula:

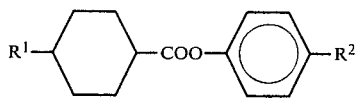
(2)

wherein $R^1$ is selected from the group consisting of straight chain alkyl groups having two to three carbon atoms, $R^2$ is selected from the group consisting of straight chain alkoxy groups having three to six carbon atoms, and wherein the saturated ring has a trans conformation. Examples of suitable cyclohexane carboxylate esters useful in the practice of the invention include compounds in which $R^1$ is $-C_3H_7$ and $R^2$ is $-OC_4H_9$ and $-OC_5H_{11}$.

At least one diester is also present in the composition of the present invention. These diesters are represented by the formula:

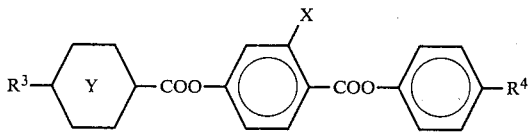
(3)

wherein $R^3$ is selected from the group consisting of straight chain alkyl groups having one to five carbon atoms, $R^4$ is selected from the group consisting of straight chain alkyl groups having four or five carbon atoms, wherein X is H or Cl, and wherein

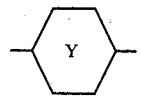

is either aromatic or saturated with a trans conformation. Examples of suitable diesters useful in the practice of the invention include compounds in which $R^3$ is $-C_3H_7$ and $-C_5H_{11}$ and $R^4$ is $-C_5H_{11}$.

The biphenyls constitute in total from about 60 to about 73% by weight of the composition, the cyclohexane carboxylate esters range from about 15 to about 23% by weight of the composition and the diesters range from about 5 to about 10% by weight of the composition when X is H and from about 5 to about 16% by weight when X is Cl. The compositions of the invention are easily prepared by mixing the individual compounds together in the desired proportions.

The liquid crystal compositions of the present invention advantageously exhibit a nematic phase over the temperature range of at least about −20° C. to 50° C. or greater, have a positive dielectric anisotropy and have electro-optic characteristics suitable for multiplexing at least five lines (20 duty cycle) in a twisted nematic display. The compositions of the present invention have moderate viscosity and a birefringence of 0.16 to 0.19, thus making them usable in displays with cell spacings of about 7 μm. The compositions are chemically and photochemically stable.

Compositions outside the ranges given above may not evidence a nematic phase over the desired indicated temperature range and are thus unusable for superior multiplex displays.

The following examples are presented for illustrative purposes and the present invention should not be construed as being limited thereto.

EXAMPLES OF THE PRESENT INVENTION

The following compositions were prepared using the three classes of compounds encompassed by the present invention but employing amounts of constituents both inside and outside the scope of the present invention.

The para-substituted cyanobiphenyls were purchased from EM Labs (New York, N.Y.) and were used without further purification. The trans para-substituted cyclohexane para-alkoxyphenyl esters were prepared by standard techniques; see Neubert et al, *Liquid Crystals and Ordered Fluids,* Vol. 2, page 293, Plenum Press, 1973. The trans para-substituted cyclohexane carboxylic acids were prepared from the commercially available benzoic acid analogs by hydrogenation using Raney nickel catalysts by the procedure set forth in U.S. Pat. No. 4,113,647. The para-substituted alkoxyphenols were obtained commercially from Aero Chemicals (Newark, N.J.). The para-substituted phenyl para-substituted benzoyloxybenzoates were prepared by known procedures set forth in U.S. Pat. No. 3,915,883. The para-substituted phenyl para-substituted cyclohexane carbonyloxybenzoates were prepared by known techniques set forth in U.S. Pat. No. 4,113,647.

The appropriate weight percentages of the individual components were mixed together by stirring and heating in an isotropic phase at about 60° to 70° C. Transition temperatures were determined by hot stage microscopy (Mettler FP5+FP 52). The birefringence of the liquid crystal mixtures was determined by a calibrated wedge technique as described by Haller et al, *Molecular Crystals and Liquid Crystals,* Vol. 16, pp. 53–59, 1972. Typical values were obtained ranging from 0.16 to 0.19. The viscosity of the liquid crystal mixtures was determined using calibrated viscometer (Cannon Fenske, State College, Pa.). Typical value were 40 to 60 cst at 25° C.

EXAMPLE 1 (Present Invention)

Component (a):

(i) N≡C—⟨O⟩—⟨O⟩—C$_5$H$_{11}$   42.8 wt%

(ii) N≡C—⟨O⟩—⟨O⟩—C$_7$H$_{15}$   30.2 wt%
                                    73.0 wt%

Component (b):

C$_3$H$_7$—⟨⟩—COO—⟨O⟩—OC$_5$H$_{11}$   17.1 wt%

Component (c):

C$_5$H$_{11}$—⟨⟩—COO—⟨O⟩—COO—⟨O⟩—C$_5$H$_{11}$   9.9 wt%

EXAMPLE 2

| Component (a): | |
|---|---|
| (i) Same as Example 1 | 37.1 wt % |
| (ii) Same as Example 1 | 24.7 wt % |
| | 61.8 wt % |
| Component (b): | |
| Same as Example 1 | 17.1 wt % |
| Component (c): | |
| Same as Example 1 | 15.1 wt %* |

*Outside scope of present invention

EXAMPLE 3 (Present Invention)

| Component (a): | |
|---|---|
| (i) Same as Example 1 | 42.0 wt% |
| (ii) Same as Example 1 | 28.0 wt% |
| | 70.0 wt% |
| Component (b): | |
| Same as Example 1 | 20.0 wt% |
| Component (c): | 10.0 wt% |

C$_3$H$_7$—⟨⟩—COO—⟨O⟩—COO—⟨O⟩—C$_5$H$_{11}$

EXAMPLE 4

| Component (a): | |
|---|---|
| (i) Same as Example 3 | 38.5 wt % |
| (ii) Same as Example 3 | 25.7 wt % |
| | 64.2 wt % |
| Component (b): | |
| Same as Example 3 | 21.2 wt % |
| Component (c): | |
| Same as Example 3 | 14.6 wt %* |

*Outside scope of present invention.

EXAMPLE 5 (Present Invention)

Component (a):

(i) N≡C—⟨O⟩—⟨O⟩—C$_8$H$_{17}$   27.8 wt%

(ii) Same as Example 1   40.1 wt%
                          67.9 wt%

Component (b):
Same as Example 1   19.2 wt%

Component (c):   12.9 wt%

C$_5$H$_{11}$—⟨O⟩—COO—⟨O(Cl)⟩—COO—⟨O⟩—C$_5$H$_{11}$

EXAMPLE 6

| Component (a): | |
|---|---|
| (i) Same as Example 5 | 25.4 wt % |
| (ii) Same as Example 5 | 36.7 wt % |
| | 62.1 wt % |
| Component (b): | |
| Same as Example 5 | 17.5 wt % |
| Component (c): | |
| Same as Example 5 | 20.4 wt %* |

*Outside scope of present invention.

EXAMPLE 7 (Present Invention)

| Component (a): | |
|---|---|
| (i) Same as Example 1 | 5.0 wt % |
| (ii) Same as Example 1 | 35.6 wt % |

(iii) N≡C—⟨O⟩—⟨O⟩—C$_{10}$H$_{21}$   23.4 wt %
                                       64.0 wt %

| Component (b): | |
|---|---|
| Same as Example 1 | 20.0 wt % |
| Component (c): | |
| Same as Example 5 | 16.0 wt % |

EXAMPLE 8 (Present Invention)

| Component (a): | |
|---|---|
| (i) Same as Example 1 | 23.8 wt % |
| (ii) Same as Example 1 | 29.7 wt % |
| (iii) Same as Example 7 | 19.1 wt % |
| | 72.6 wt % |
| Component (b): | |
| Same as Example 1 | 17.3 wt % |
| Component (c): | |
| Same as Example 1 | 10.1 wt % |

EXAMPLE 9 (Present Invention)

| Component (a): | |
|---|---|
| (i) Same as Example 8 | 20.8 wt % |
| (ii) Same as Example 8 | 25.8 wt % |
| (iii) Same as Example 8 | 16.6 wt % |
| | 63.2 wt % |
| Component (b): | |
| Same as Example 8 | 28.0 wt %* |
| Component (c): | |
| Same as Example 8 | 8.8 wt % |

*Outside scope of present invention.

EXAMPLE 10 (Present Invention)

| Component (a): | |
|---|---|
| (i) N≡C—⌬—⌬—C$_2$H$_5$ | 5.0 wt % |
| (ii) Same as Example 1 | 40.3 wt % |
| (iii) Same as Example 7 | 25.1 wt % |
| | 70.4 wt % |
| Component (b): | |
| Same as Example 1 | 19.4 wt % |
| Component (c): | |
| Same as Example 1 | 10.2 wt % |

EXAMPLE 11 (Present Invention)

| Component (a): | |
|---|---|
| (i) N≡C—⌬—⌬—C$_7$H$_{15}$ | 39.8 wt % |
| (ii) N≡C—⌬—⌬—C$_8$H$_{17}$ | 19.7 wt % |
| (iii) N≡C—⌬—⌬—OC$_3$H$_7$ | 10.6 wt % |
| | 70.1 wt % |
| Component (b): | |
| Same as Example 1 | 19.1 wt % |
| Component (c): | |
| Same as Example 1 | 10.8 wt % |

EXAMPLE 12 (Present Invention)

| Component (a): | |
|---|---|
| (i) Same as Example 11 | 33.2 wt % |
| (ii) N≡C—⌬—⌬—C$_{10}$H$_{21}$ | 24.5 wt % |
| (iii) Same as Example 11 | 15.0 wt % |
| | 72.7 wt % |
| Component (b): | |
| Same as Example 1 | 17.5 wt % |
| Component (c): | |
| Same as Example 1 | 9.8 wt % |

EXAMPLE 13 (Present Invention)

| Component (a): | |
|---|---|
| (i) Same as Example 1 | 5.1 wt % |
| (ii) Same as Example 1 | 22.6 wt % |
| (iii) N≡C—⌬—⌬—C$_8$H$_{17}$ | 32.0 wt % |
| (iv) N≡C—⌬—⌬—OC$_3$H$_7$ | 10.1 wt % |
| | 69.8 wt % |
| Component (b): | |
| Same as Example 1 | 20.2 wt % |
| Component (c): | |
| Same as Example 1 | 10.0 wt % |

EXAMPLE 14 (Present Invention)

| Component (a): | |
|---|---|
| (i) Same as Example 1 | 6.1 wt % |
| (ii) Same as Example 1 | 31.4 wt % |
| (iii) N≡C—⌬—⌬—C$_{10}$H$_{21}$ | 23.5 wt % |
| (iv) Same as Example 13 | 9.4 wt % |
| | 70.4 wt % |
| Component (b): | |
| Same as Example 1 | 19.6 wt % |
| Component (c): | |
| Same as Example 1 | 10.0 wt % |

EXAMPLE 15 (Present Invention)

| Component (a): | |
|---|---|
| (i) Same as Example 1 | 3.7 wt % |
| (ii) Same as Example 1 | 31.0 wt % |
| (iii) Same as Example 14 | 22.7 wt % |
| (iv) Same as Example 13 | 9.4 wt % |
| | 66.1 wt % |
| Component (b): | |
| Same as Example 1 | 22.5 wt % |
| Component (c): | |
| Same as Example 3 | 10.7 wt % |

TABLE 1

| Example | Nematic Ranges Within Scope of Present Invention | Nematic Range (Degrees Centigrade) |
|---|---|---|
| 1 | Yes | < −20 to 55 |
| 2 | No | 13.5 to 63.3 |
| 3 | Yes | < −20 to 56.5 |
| 4 | No | 12.9 to 63.2 |
| 5 | Yes | < −20 to 50.8 |
| 6 | No | 0 to 55.2 |
| 7 | Yes | < −20 to 53.0 |
| 8 | Yes | < −20 to 56.0 |
| 9 | No | 13.8 to 59.1 |
| 10 | Yes | < −20 to 58.1 |
| 11 | Yes | < −20 to 61.8 |
| 12 | Yes | < −20 to 59.8 |
| 13 | Yes | < −20 to 59.6 |
| 14 | Yes | < −20 to 60 |
| 15 | Yes | < −20 to 60.8 |

Table 1 shows the nematic range for compositions inside the scope of the invention and outside the scope of the invention. It will be readily seen that those within the scope of the invention evidence the desired temperature range for nematic phase existence (< −20° to at least 50° C.), while those outside the scope of the invention evidence less desirable temperature ranges for nematic phase existence.

The contrast versus voltage characteristics of the liquid crystal compositions of the invention were measured in a twisted nematic cell. The cell was constructed from patterned conductive coated glass spaced apart and sealed using Ablefilm 517 epoxy preforms.

Alignment was obtained by oblique angle deposition (30°) of silicon monoxide (500 Å) and rubbing to produce uniform low tilt surfaces, as is known in the art. Cell spacing was measured by light section microscopy and the capacitance of the empty cell. The cell spacing was typically about 7 μm.

The filled cell was placed between crossed polarizers (41% transmission), and the contrast in the reflective mode was measured as a function of a variable square wave voltage applied to the display. A photometer (Spotmeter, Photo Research, Burbank, California) was used to measure the change in brightness.

Of particular importance in assessing the multiplexing characteristics of the display are:

1. Threshold voltage at normal incidence $V_{10}^{90°}$ (defined as a 10% change in brightness).
2. Threshold voltage at 45° off normal incidence in the preferred viewing quadrant, $V_{10}^{45°}$ (defined as a 10% change in brightness).
3. Saturation voltage at normal incidence $V_{90}^{90°}$ (defined as a 90% change in brightness).

To relate their values to the performance of the liquid compositions, a merit number is defined, $V_{90}^{90°}/V_{10}^{45°}$. For examples of other liquid crystal compositions, where this ratio has been determined, see E. P. Raynes, "Recent Advances in Liquid Crystal Materials and Display Devices", IEEE/SID Biennial Display Research Conference Proceedings, pp. 8-11, 1979.

The liquid crystal compositions of this invention as evidenced by the above, have a merit number of $<1.75$ when measured under the conditions described.

When the duty cycle of multiplexing is 1 in 5 (20%), a merit number of 1.75 or less results in a head on contrast ratio of $>3:1$ and $>10:1$ at 20 off axis in the preferred viewing direction. For a merit number of 1.70 or less, the display has a head on contrast ratio of $>2:1$ and $>5:1$ at 20 off axis in the preferred viewing direction at a duty cycle of 1 in 10.

The following results were obtained employing the mixtures listed in Table 2 below:

TABLE 2

| Example | Voltage Characteristics | | | Merit No. |
| --- | --- | --- | --- | --- |
| | $V_{10}^{45}$ | $V_{10}^{90}$ | $V_{90}^{90}$ | |
| 10 | 1.37V | 1.61V | 2.30V | 1.68 |
| 11 | 1.30V | 1.62V | 2.20V | 1.69 |
| 13 | 1.28V | 1.55V | 2.24V | 1.75 |
| 15 | 1.55V | 1.79V | 2.65V | 1.71 |

As can be seen, the merit number of the liquid crystal compositions of the invention are 1.75 or less and, accordingly, provide at least five line multiplexing capability.

Furthermore, the temperature dependence of the threshold voltage for these liquid crystal compositions is about 8-10 mV/C.

By way of further example of the advantageous electro-optic behavior of the liquid crystal compositions, a viewing cone plot of the composition of Example 11 in a twisted nematic display addressed with a 1 in 10 duty cycle is shown in FIG. 1.

What is claimed is:

1. A liquid crystal composition for multiplexed twisted nematic displays which exists in a nematic mesophase from at least about −20° to 50° C., comprising:
   (a) From two to four cyanobiphenyl compounds represented by the formula:

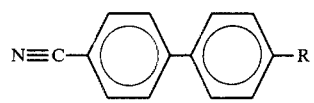

wherein R is selected from the group consisting of straight chain alkyl groups having two to ten carbon atoms and the propoxy radical, at least one of said cyanobiphenyl compounds having an alkyl group of from two to seven carbon atoms, and when R in one of said cyanobiphenyl compounds is a propoxy radical, said propoxy radical containing compound ranges from approximately 5 to 15% by weight of the total composition;

(b) at least one cyclohexane carboxylate ester compound represented by the formula:

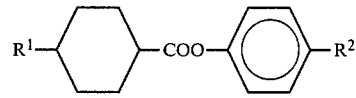

wherein $R^1$ if selected from the group consisting of straight chain alkyl groups having two to three carbon atoms, wherein $R^2$ is selected from the group consisting of straight chain alkoxy groups having three to six carbon atoms, and wherein the saturated ring has a trans conformation; and, (c) at least one diester compound represented by the formula:

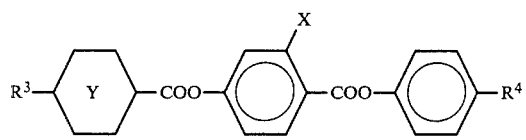

wherein $R^3$ is selected from the group consisting of straight chain alkyl groups having one to five carbon atoms, wherein $R^4$ is selected from the group consisting of straight chain alkyl groups having four or five carbon atoms, wherein X is H or Cl, and wherein

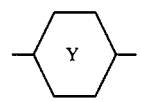

is either aromatic or is saturated with a trans conformation, subject to the proviso that the cyanobiphenyls range from about 60 to 73% by weight of the composition, the cyclohexane carboxylate esters range from about 15 to 23% by weight of the composition and the diesters range from about 5 to 10% by weight of the composition when X is H and from about 5 to 16% by weight when X is Cl.

2. The composition of claim 1 in which at least three cyanobiphenyl compounds are present.

3. The composition of claim 1, wherein a preferred cyanobiphenyl compound has an alkyl group of seven carbon atoms.

4. The composition of claim 2 in which one of the cyanobiphenyl compounds is a propoxy compound.

5. The composition of claim 1 wherein a preferred combination of cyanobiphenyl compounds has alkyl groups of seven and eight carbon atoms.

6. The composition of claim 1 in which R is selected from the group consisting of —$C_2H_5$, —$C_5H_{11}$, —$C_7H_{15}$, —$C_8H_{17}$, —$C_{10}H_{21}$, and —$OC_3H_7$, $R^1$ is —$C_3H_7$, $R^2$ is —$OC_5H_{11}$, $R^3$ is selected from the group consisting of —$C_3H_7$ and —$C_5H_{11}$ and $R^4$ is —$C_5H_{11}$.

7. The composition of claim 6 consisting essentially of

| | |
|---|---|
| N≡C—⟨⟩—⟨⟩—C₇H₁₅ | 39.8 wt% |
| N≡C—⟨⟩—⟨⟩—C₈C₁₇ | 19.7 wt% |
| N≡C—⟨⟩—⟨⟩—OC₃H₇ | 10.6 wt% |
| C₃H₇—⟨H⟩—COO—⟨⟩—OC₅H₁₁ | 19.1 wt% |
| C₅H₁₁—⟨⟩—COO—⟨⟩—COO—⟨⟩—C₅H₁₁ | 10.8 wt% |

8. The composition of claim 6 consisting essentially of

| | |
|---|---|
| N≡C—⟨⟩—⟨⟩—C₂H₅ | 5.0 wt% |
| N≡C—⟨⟩—⟨⟩—C₇H₁₅ | 40.3 wt% |
| N≡C—⟨⟩—⟨⟩—C₁₀H₂₁ | 25.1 wt% |
| C₃H₇—⟨H⟩—COO—⟨⟩—OC₅H₁₁ | 19.4 wt% |
| C₅H₁₁—⟨⟩—COO—⟨⟩—COO—⟨⟩—C₅H₁₁ | 10.2 wt% |

9. The composition of claim 6 consisting essentially of

| | |
|---|---|
| N≡C—⟨⟩—⟨⟩—C₅H₁₁ | 3.7 wt% |
| N≡C—⟨⟩—⟨⟩—C₇H₁₅ | 31.0 wt% |
| N≡C—⟨⟩—⟨⟩—OC₁₀H₂₁ | 22.7 wt% |
| N≡C—⟨⟩—⟨⟩—OC₃H₇ | 9.4 wt% |
| C₃H₇—⟨H⟩—COO—⟨⟩—OC₅H₁₁ | 22.5 wt% |
| C₃H₇—⟨H⟩—COO—⟨⟩—COO—⟨⟩—C₅H₁₁ | 10.7 wt% |

* * * * *